United States Patent [19]

Wilke

[11] 4,054,779

[45] Oct. 18, 1977

[54] COUNTING DEVICE

[75] Inventor: Robert A. Wilke, Winona, Minn.

[73] Assignee: Lake Center Industries, Winona, Minn.

[21] Appl. No.: 706,797

[22] Filed: July 19, 1976

[51] Int. Cl.² ............................................. B65G 51/36
[52] U.S. Cl. ............................. 235/92 PK; 235/92 V; 235/92 R; 250/222 PC
[58] Field of Search .......... 235/92 PK, 92 V, 92 PB, 235/92 ST, 98 C; 340/239 R; 250/223 R, 575, 573, 222 R, 222 PC, 224, 578, 560, 208, 209

[56] References Cited

U.S. PATENT DOCUMENTS

| 3,537,091 | 10/1970 | Schenkenberg | 250/223 R |
| 3,700,904 | 10/1972 | Stobble et al. | 250/222 PC |
| 3,928,751 | 12/1975 | Fathauer | 235/92 V |
| 3,955,179 | 5/1976 | Planke | 235/92 PK |

Primary Examiner—Joseph M. Thesz
Attorney, Agent, or Firm—Kinzer, Plyer, Dorn & McEachran

[57] ABSTRACT

A seed monitor for a multiple station planter includes a light source adjacent each seed path and a pair of phototransistors positioned in alignment with each light source. The phototransistors for each seed path are connected to pulse generating means, each of which provide a constant width pulse in response to an interruption in light received by a phototransistor from its light source. An OR gate is connected to the pulse generating means so as to provide an output signal whenever there is a pulse at one of its inputs. The light sources for the multiple seed paths may be operated to periodically monitor each planting station.

12 Claims, 4 Drawing Figures

TRANSISTOR 18 OUTPUT

TRANSISTOR 20 OUTPUT

MONOSTABLE 38 OUTPUT

MONOSTABLE 40 OUTPUT

"OR" GATE 42 OUTPUT 4,054,779

COUNTING DEVICE

SUMMARY OF THE INVENTION

The present invention relates to seed monitors and in particular to a seed monitor which has utility in monitoring different types of seeds which are being planted at different planting rates.

One purpose of the invention is a seed monitor of the type described which repetitively monitors multiple planting stations.

Another purpose is a seed monitor which can be used to monitor the planting of both corn and soybeans.

Another purpose is a seed monitor which utilizes statistical averaging when monitoring seeds being planted at a rapid rate.

Another purpose is a simply constructed reliably operable seed monitor of the type described.

Another purpose is a seed monitor for a multiple station planter which utilizes a light source and a pair of spaced phototransistors for each seed path.

Another purpose is a seed monitor of the type described utilizing pulse generating means and a logic circuit to provide a statistical average of the number of seeds passing through each seed path.

Another purpose is a seed monitor which provides an electrical signal which represents the number of seeds passing the sensor.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention has utility in connection with multiple station planters of the type commonly used to plant corn, soybeans and the like. The seeds are planted or dispensed from the planter at different rates, depending upon the type of grain being planted. For example, corn may be planted at the rate of 10 –25 seeds per second per planting station, whereas, soybeans may be planted at the rate of 50 –100 seeds per second per planting station. It is necessary that any seed monitor have the capability to monitor different planting rates for different types of grain. The seed path of travel from the seed dispenser to the ground in commonly available seed planters is such that although seeds may be dispensed singly, by the time they arrive at the sensor area they are somewhat grouped together, making it impossible to optically sense single discrete particles. For this reason, the present system uses a statistical average to provide an indication of the planting rate.

Figure 1:
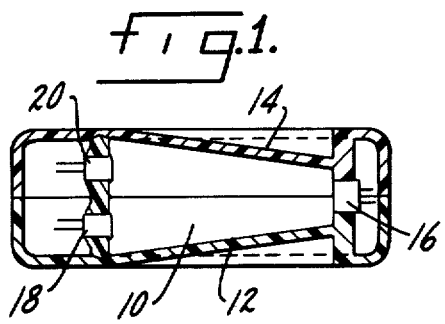
FIG. 1 is a partial cross section through a portion of one seed path in a multiple station planter.

In FIG. 1 a portion of a single seed path is shown to have a trapezoidal cross section, with the path for the seeds being indicated by the area 10. Walls 12 and 14 define the sides of path 10. The cross section of FIG. 1 is generally perpendicular to the path of the seeds moving through the tube which serves as a means for dispensing seeds at one planting station.

An infrared light source, preferably a light emitting diode, is indicated at 16 and is positioned along the short side of the trapezoid. A pair of phototransistors are indicated at 18 and 20 and are positioned on the opposite side of the trapezoid. Each transistor may in fact be a single package comprising a pair of transistors commonly called photodarlington. Such a package provides higher signal amplitude for a given change in light input.

The side walls 12 and 14 in cooperation with LED 16 form a light path which eliminates unilluminated areas. Since the LED is a point source of light it is possible for a single seed to cast sufficient shadow to cause a change in a transistor output which in turn provides a counting pulse, as described in detail hereinafter. Each of the phototransistors have an angle of view of about 30°. The size of the phototransistors and the size of the seed path 19 are such that it is possible for a seed to cause an interruption in light received at one phototransistor, but not the other. The path must be of a sufficient size to provide an uninterrupted flow of seeds at the prescribed rate. Because of the size of the seed path, it is necessary to use multiple phototransistors in order to correctly detect the total number of seeds that are passing through the path without in any way hindering the flow.

As indicated above, the number of planting stations will vary. At times there may be as many as 16 and there may be few as four. The cab monitor for the farmer will have a single readout device which will indicate the planting rate and will be connected, as described, to repetitively scan or monitor each planting station. All of the phototransistors are conected into the monitoring circuit. The light source at each planting station and its associated phototransistors are repetitively activated for a given period of time so that the montior may determine the planting rate at that particular station. If in fact the planting rate is incorrect at any particular station, the farmer may stop his planting operation and make mechanical adjustments to correct it.

Figure 2:
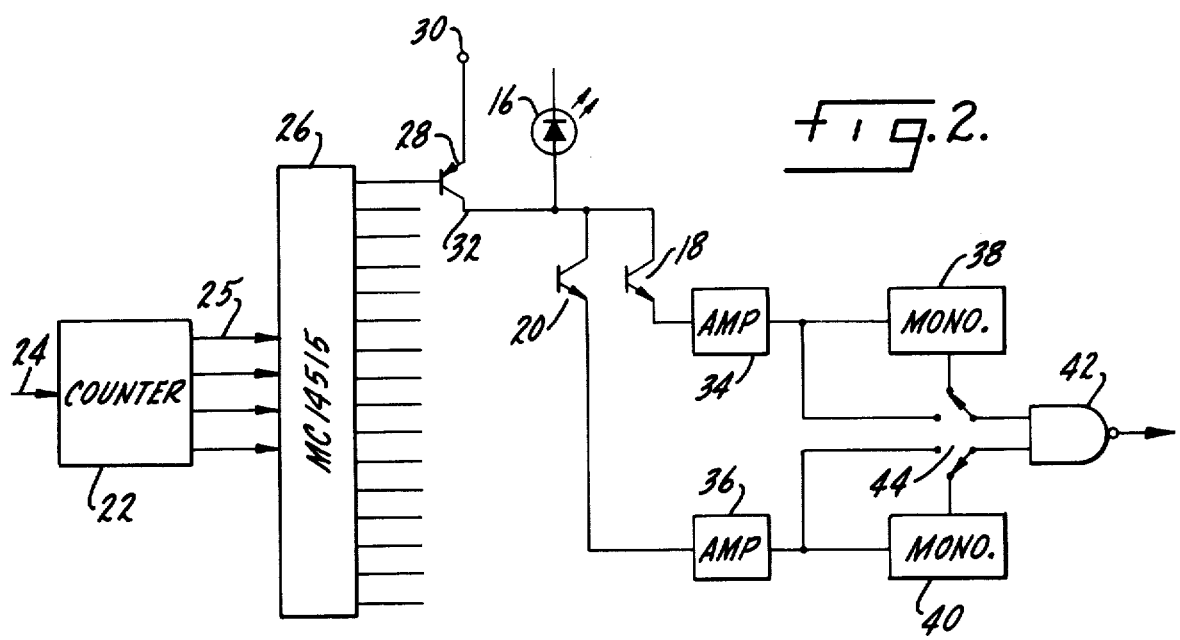
FIG. 2 is a diagram of the electrical circuit for the seed monitor.

In FIG. 2, a counter 22 will receive timed pulses on line 24, which timed pulses correspond to the repetitive scanning rate. Counter 22 is connected by four lines 25 to a multiplex circuit 26, which may be an MC 14515. As shown, multiplex circuit 26 has 16 outputs, assuming a 16-station planter. Each output includes a transistor 28 connected to a common source of voltage indicated at 30 and an output line 32. Output line 32 is connected to LED 16 and to the collectors of phototransistors 18 and 20.

Each time a timing pulse is received over line 24 at counter 22, the binary number on output lines 25 from the counter to multiplex circuit 26 will change, thus changing the particular output line 32 which is energized. This in turn will cause a certain LED and its associated phototransistors to receive operating current. The planting stations may be sequentially monitored, or they may be monitored in a random fashion. The tractor cab may have controls whereby the farmer may continuously monitor one channel or station for a given period of time after which the remaining stations will be repetitively monitored. The manner in which the various planting stations can be monitored will vary. What is important is that the multiplex circuit activate only a single LED and its associated phototransistors at a given time and for a predetermined interval.

The emitters of phototransistors 18 and 20 are connected to pulse shaping and amplifier circuits 34 and 36. Amplifiers 34 and 36 are each connected to monostable multivibrators indicated respectively at 38 and 40. The output from monostable multivibrators 38 and 40 are each connected to an OR gate 42 through a switch 44. Switch 44 may connect the OR gate inputs to either the monostable multivibrators or directly to amplifiers 34 and 36.

Switch 44 will connect OR gate 42 to the monostable multivibrators 38 and 40 when the circuit described is being used to monitor the planting of soybeans or a type of grain which requires a heavy distribution of seeds per acre of planting area. On the other hand, switch 44 will connect OR gate 42 directly to amplifiers 34 and 36 when corn is being planted or a grain in which there is a lower concentration of seeds per area.

Figure 4:
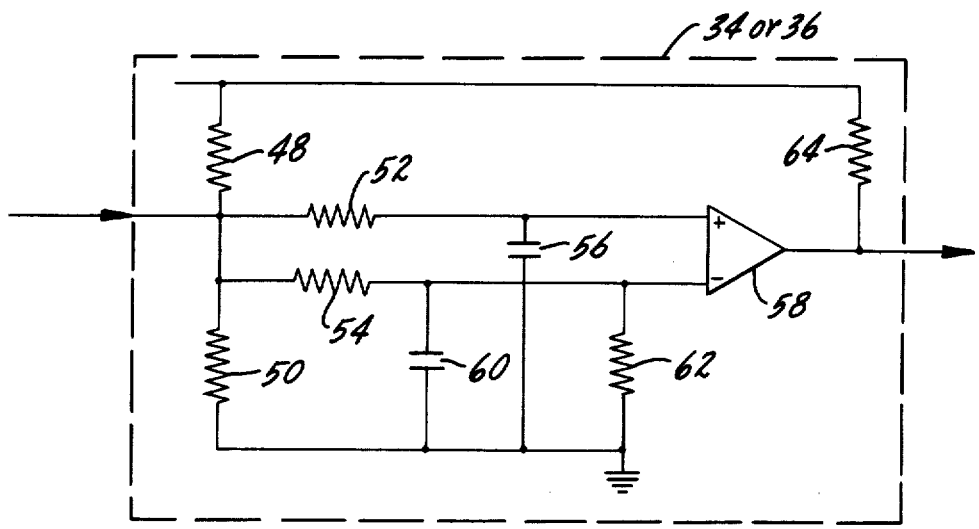
FIG. 4 is an electrical diagram of the amplifier of FIG. 2.

Amplifiers 34 and 36 are identical and are illustrated in FIG. 4. The emitters of the phototransistors are connected to resistors 48 and 50 with the junction point between the resistors being connected to resistors 52 and 54. Resistor 52 and capacitor 56 form a first low pass filter which is connected to one input of a comparator 58. Resistor 54 and capacitor 60 form a second low pass filter connected in combination with a resistor 62 to the other input of comparator 58. The circuit is completed by a resistor 64 connected to the output of comparator 58 and to a source of bias voltage.

Under no signal conditions a phototransistor provides a steady voltage output. The input to comparator 58 from the filter of resistor 52 and capacitor 56 will be slightly higher than the other input due to the presence of resistor 62. Comparator 58 will provide an output pulse whenever there is a transposition in the relative values of its inputs. Since the transistor output voltage may vary, for example due to the collection of dust on the lenses, it is desirable to provide an output pulse from the comparator which recognizes a sufficient change in the light received from the phototransistor regardless of the particular no signal output voltage level from the phototransistors. Since the filter of resistor 54 and capacitor 60 has a slower time constant, a change in the input voltage to both filters will cause the input to the comparator from the filter of resistor 52 and capacitor 56 to drop below the comparator input from resistor 54 and capacitor 60, thus providing the leading edge of the comparator output pulse. This transition, plus the opposite transition when the input from the filter of resistor 54 and capacitor 60 again drops below the other input, provides the output pulse from the comparator.

The monostable multivibrators provide a means for statistically averaging pulses representing the volume of seeds passing through a particular planting station. Because of the disposition of the phototransistors and the LED, and the shape and size of the seed path cross section at the plane of the monitoring equipment, there will be occasions when the sum of the interruptions of the light source seen by the phototransistors will be greater or less than the actual number of seeds passing through for a given time period. However, by the use of the circuit described above, and functioning as described hereinafter, it is possible to arrive at a statistical average number of seeds which substantially reduces counting errors.

Figure 3:
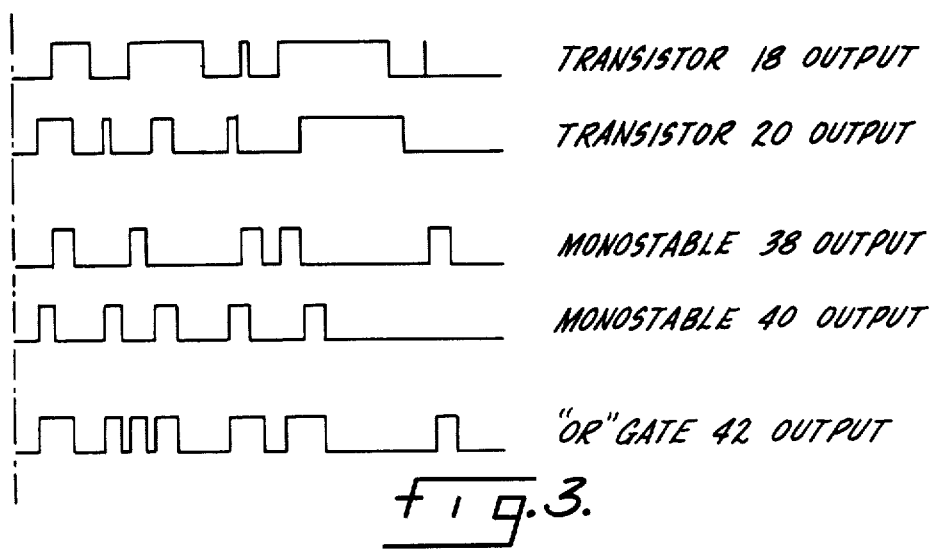
FIG. 3 is a pulse diagram illustrating the relationship of various signals in the seed monitor circuit.

Looking particularly at FIG. 3, the outputs of transistors 18 and 20 are shown on the top two lines. Each pulse represents a shadow seen by a phototransistor and resulting from the passage of a seed through the field of view of the phototransistor. It is possible for the passage of a particular seed to cause an output pulse from both transistors. These output pulses will overlap and the leading edge of the pulses may be spaced apart a small distance on a time basis. As indicated above, the monostable multivibrators will provide a pulse of a given width for every received pulse. The monostable multivibrators will be triggered by the leading edge of each input pulse. Thus, lines 3 and 4 show the outputs of monostable multivibrators 38 and 40. Note particularly that for every pulse leading edge out of transistor 18 there is a constant width output pulse from monostable multivibrator 38. In like manner, the leading edge of each pulse from transistor 20 will trigger a constant width output pulse from monostable multivibrator 40.

The output from OR gate 42 is indicated on line 5. The OR gate will have an output signal level as long as there is an input pulse at either one of its inputs. Overlapping output pulses from monostable multivibratos 38 and 40 indicate a high probability of both transistor pulses having been caused by the passage of a single seed.

As shown in FIG. 3, there are five pulses from transistor 18 and five pulses from transistor 20. Because of the overlap between the first pulses from each transistor, only one pulse will be provided at the output of gate 42. Similarly, since the third pulse from transistor 18 and the fourth pulse from transistor 20 are spaced apart a time distance less than the multivibrator pulse width, only one pulse will be provided at the output of gate 42. The same is true for the fourth and fifth pulses respectively. The end result is a total of seven output pulses for ten light interruptions.

The width of the output pulses from the monostable multivibrators in conjunction with the particular planting rate is critical in determining and controlling the probable error in the final seed count. For example, if the output pulses have substantial width, there is a high likelihood of considerable overlapping at the OR gate inputs and thus there is a tendency to count low. In like manner, if the width of the output pulse from the multivibrators is quite narrow, there is less probability of an overlap between pulses and thus there is a tendency to count high. Adjusting the width of the multivibrator pulses to an optimum point for a particular planting rate will control the statistical error in the number of counts provided by OR gate 42.

In the case of a grain being planted at a slower rate, such as corn, the statistical averaging described above is not necessary and the pulse shaper and amplifier circuits 34 and 36 may directly feed their output pulses to OR gate 42. The rate at which the seeds are passing along the seed path is sufficiently low such that there is little statistical likelihood of an unacceptable error in counting.

The output from OR gate 42 will be used to provide a visual readout in the cab of the tractor as to the planting rate at each planting station. As indicated above, the various planting stations may be sequentially monitored; they may be monitored in a random fashion; or the monitoring may be totally under the control of the operator or farmer in that he may switch from planting station to planting station.

Not only does the present system provide an indication of the planting rate, but it tells the operator if in fact seeds are being dispensed at each planting station.

Whereas the preferred form of the invention has been shown and described herein, it should be realized that there may be many modifications, substitutions and alterations thereto.

The embodiments of the invention in which an exclusive property or privilege is claimed are defined as follows:

1. A seed montior for a multiple station planter including a light source adjacent the seed path for each planter station, a pair of spaced light responsive devices in alignment with each light source, means for causing operation of each light source, a pair of pulse generating means, each pulse generating means being connected to one of each pair of light responsive devices for providing a constant width pulse in response to an interruption in light received from the light source, and logic circuit means connected to each pulse generating means, said logic circuit means providing an output signal whenever either pulse generating means provides a pulse at its input.

2. The seed monitor of claim 1 further characterized in that each of said pulse generating means includes a monostable multivibrator for providing a constant width pulse in response to an input signal.

3. The seed monitor of claim 2 further characterized in that each of said pulse generating means further includes amplifying means having an input connected to a light responsive device and its output connected to a monostable multivibrator.

4. The seed monitor of claim 3 further characterized by and including switch means for connecting said logic circuit means to either said monostable multivibrators or to said amplifying means.

5. The seed monitor of claim 1 further characterized in that said logic circuit means includes an OR gate having its inputs connected to said pulse generating means.

6. The seed monitor of claim 1 further characterized in that each of said light sources provide electromagnetic radiation in the infrared region, said light responsive devices being phototransistors.

7. The seed monitor of claim 6 further characterized in that each pair of phototransistors have a common connection on one side thereof, with the opposite side of each transistor being connected to one of said pair of pulse generating means.

8. The seed monitor of claim 1 further characterized in that the means for causing operation of each light source includes counting means.

9. The seed monitor of claim 1 further characterized in that the light responsive devices and the light source for each seed path are all positioned in a plane extending generally normal to the flow of seeds along the seed path.

10. The seed montior of claim 9 further characterized in that the cross section of each seed path at the plane of the light source and light responsive devices is generally trapezoidal in configuration, with the light responsive devices being positioned along the longer side of the trapezoid.

11. The seed monitor of claim 1 further characterized in that each of said pulse generating means includes comparison circuit means having a pair of inputs connected to a light responsive device.

12. The seed monitor of claim 11 further characterized by and including a pair of filter circuis having different time constants conected between said comparison circuit inputs and a light responsive device.

* * * * *